United States Patent Office
3,494,914
Patented Feb. 10, 1970

3,494,914
ANTIBACTERIAL AGENTS
John Gerard Keil, Manlius, and Irving R. Hooper, Fayetteville, N.Y., assignors to Bristol-Myers Company, New York, N.Y., a corporation of Delaware
No Drawing. Filed Apr. 29, 1968, Ser. No. 725,216
Int. Cl. C07d 99/04
U.S. Cl. 260—210     8 Claims

ABSTRACT OF THE DISCLOSURE

Compounds of the formula

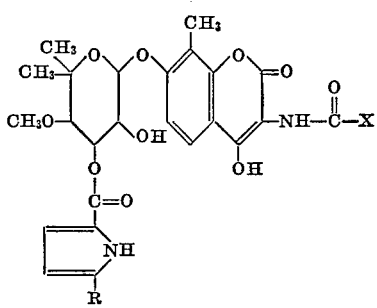

wherein R is hydrogen or methyl; and X is a group having the formula

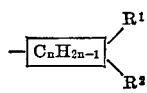

or

in which $n$ is an integer of 1 to 21, $m$ is an integer of 2 to 21, $R^1$ and $R^2$ are alike or different and are —H, cyclohexyl or

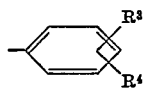

wherein $R^3$ and $R^4$ are alike or different and each represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower) alkoxy, hydroxy, carboxy, carb(lower)alkoxy, acetoxy, mercapto, thioacetoxy or (lower)alkylthio; or a nontoxic, pharmaceutically acceptable salt thereof; are prepared by mixing either the compound having the formula wherein R is hydrogen or methyl, and $R^2$ and $R^3$ are the same or different and are either —H or

or the compound having the formula

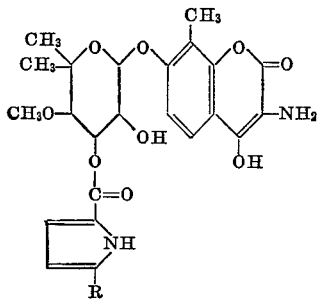

in which R is hydrogen or methyl; with an acid halide having the formula

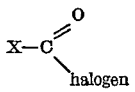

or its functional equivalent as an acylating agent in which X is a group having the formula

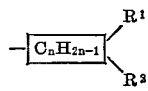

or

in which $n$ is an integer of 1 to 21, $m$ is an integer of 2 to 21, $R^1$ and $R^2$ are alike or different and are —H, cyclohexyl, or

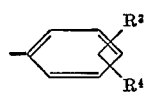

wherein $R^3$ and $R^4$ are alike or different and each represent hydrogen, fluoro, chloro, bromo, iodo, trifluoromethyl, trichloromethyl, di(lower)alkylamino, nitro, cyano, acetoxy, (lower)alkyl, (lower)alkenyl, (lower)alkynyl, (lower)alkoxy, N,N-di(lower)alkylcarboxamido, thioacetoxy, carb(lower)alkoxy or (lower)alkylthio. These compounds are useful as antibacterial agents.

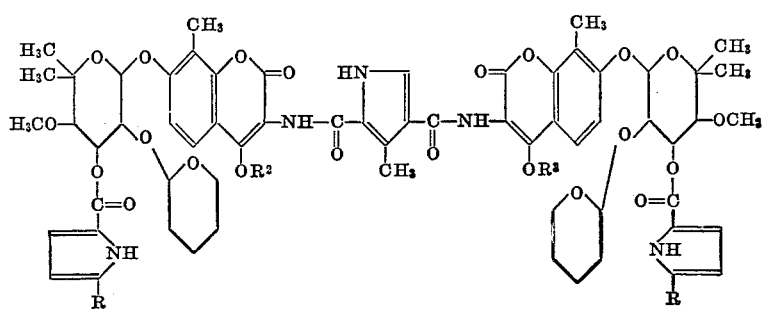

BACKGROUND OF THE INVENTION

Field of the invention

This invention relates to novel synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive and some gram-negative bacteria.

There exists a need to provide alternative and improved agents for the treatment of infections caused by gram-positive bacteria (including those resistant to benzylpenicillin) and by gram-negative bacteria and for the decontamination of objects bearing such organisms, e.g. hospital equipment, walls of operating rooms and the like. Of particular need are antibacterial agents which exhibit good oral absorption in animals.

Description of the prior art

The antibiotic substances coumermycin $A_1$ and $A_2$ are described in U.S. Patent 3,201,386. The tetrahydropyranyl ether derivatives of these compounds are described in U.S. patent application Ser. No. 583,992, filed Oct. 3, 1966 now Patent No. 3,380,994.

SUMMARY OF THE INVENTION

This invention relates to alkyl and alkene acyl derivatives of 3-amino-4-hydroxy-8-methyl-7-[3-0-(5-methyl-2-pyrrolylcarbonyl)noviosyloxy]coumarin. It relates further to the use of these compounds as antibacterial agents.

This invention relates to antibacterial agents which are derivatives of the antibiotic substances coumermycin $A_1$ and coumermycin $A_2$ (U.S. Patent 3,201,386) and to processes for their production. More particularly it relates to products resulting from the acylative cleavage of the tetrahydropyranyl ethers of coumermycins $A_1$ and $A_2$ and to the process of preparing same by the reaction of an acylating agent of the alkane or alkene series with said tetrahydropyranyl (THP) derivatives.

Coumermycin $A_1$ (R is methyl) and coumermycin $A_2$ (R is hydrogen)

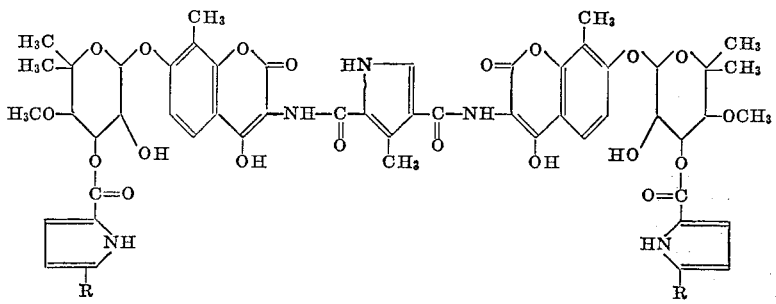

are effective in inhibiting the growth of gram-positive bacteria. Both are non-toxic and exhibit a therapeutic effect on mice infected with gram-positive bacteria. A major disadvantage of the coumermycins however is their poor absorption and resultant low blood levels. Efforts to correct these deficiencies have resulted according to the present invention, in new and novel N-acyl cleavage products of the parent coumermycins, said compounds being antibacterial agents active against *Staphylococcus aureus* Smith.

These objectives were obtained by the provision, according to the present invention, of the compounds having the formula

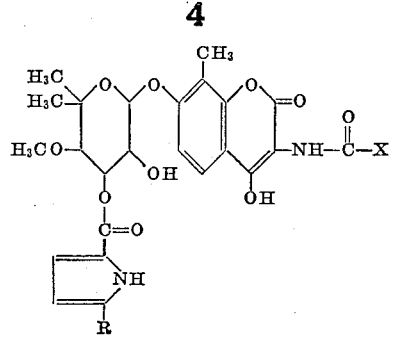

(I)

wherein R is either hydrogen or methyl, and X is a group, having the formula

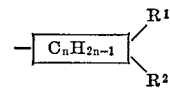

or

in which $n$ in an integer of 1 to 21, $m$ is an integer of 2 to 21, $R^1$ and $R^2$ are alike or different and are —H, cyclohexyl or

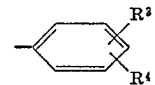

wherein $R^3$ and $R^4$ are alike or different and each represents hydrogen, fluoro, chloro, bromo, iodo, trifluoromethyl, amino, N,N-di(lower)alkylamino nitro, cyano, (lower)alkyl, (lower)alkenyl, (lower)alkynyl, (lower)-alkoxy, hydroxy, carboxy, carb(lower)alkoxy, acetoxy, mercapto, thioacetoxy or (lower)alkylthio; and the non-toxic pharmaceutically acceptable cationic salts thereof.

A further limited and preferred embodiment of the present invention comprises the compounds having the Formula I, wherein R is hydrogen or methyl; X is a group having the formula

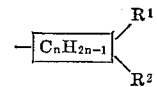

or

in which $n$ is an integer of 1 to 13, $m$ is an integer of 2 to 13, $R^1$ and $R^2$ are alike or different and are —H, cyclohexyl or

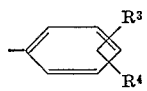

wherein $R^3$ and $R^4$ are alike or different and each represents hydrogen, fluoro, chloro, bromo, iodo, trifluoromethyl, N,N-di(lower)alkylamino, nitro, cyano, (lower)alkyl, (lower)alkenyl, (lower)alkynyl, (lower)alkoxy, N,N-di(lower)alkylcarboxamido, carb(lower)alkoxy, acetoxy, thioacetoxy or (lower)alkylthio; and the nontoxic, pharmaceutically acceptable cationic salts thereof.

A more preferred embodiment of the present invention is the group of compounds having the Formula I wherein R is methyl, X is a group having the formula

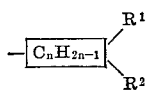

or

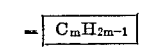

in which $n$ is an integer of 1 to 13, $m$ is an integer of 2 to 13, $R^1$ and $R^2$ are alike or different and are —H or

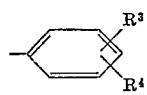

wherein $R^3$ and $R^4$ are alike or different and each represent hydrogen, fluoro, chloro, bromo, iodo, trifluoromethyl, amino, nitro, cyano, (lower)alkyl, (lower)alkenyl, (lower)alkynyl, (lower)alkoxy, hydroxy, carboxy, carb(lower)alkoxy and acetoxy; and the nontoxic, pharmaceutically acceptable cationic salts thereof.

A most preferred group of compounds within the scope of the present invention comprises the compounds having the Formula I, wherein R is methyl, X is a group having the formula

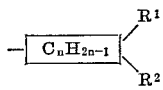

or

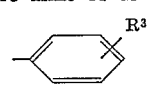

in which $n$ is an integer of 1 to 8, $m$ is an integer of 2 to 8, and $R^1$ and $R^2$ are alike or different and are —H or

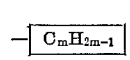

in which $R^3$ represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower)alkoxy, hydroxy, mercapto, carboxy, car(lower)alkoxy, acetoxy, thioacetoxy, or (lower)alkylthio and the nontoxic, pharmaceutically acceptable cationic salts thereof.

A most preferred embodiment of the present invention is the group of compounds having the Formula I wherein R is methyl, X is a group having the formula

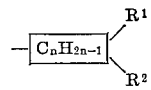

in which $n$ is an integer of 1 to 8, $R^1$ and $R^2$ are both hydrogen; and a nontoxic pharmaceutically acceptable salt thereof.

The most preferred embodiment of the present invention is the compound having Formula I wherein R is methyl and X is

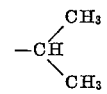

and a nontoxic, pharmaceutically acceptable salt thereof.

The term "(lower)alkyl" as used herein means both straight and branched chain aliphatic hydrocarbon radicals having from one to eight carbon atoms such as methyl, ethyl, propyl, isopropyl, butyl, isobutyl, t-butyl, amyl, hexyl, etc. Where the term "(lower)" is used as part of the description of another group, e.g. "(lower)alkoxy," it refers to the alkyl portion of such group which is therefore as described above in connection with "(lower)alkyl" and thus includes such radicals as methoxy, ethoxy, isopropoxy, etc. The term "(lower)alkenyl" as used herein means both straight and branched chain unsaturated hydrocarbon radicals of the formula —$(C_nH_{2n-1})$, wherein $n$ is a whole integer of 2 to 8, i.e., —$CH_2$—$CH$=$C(CH_3)_2$, —$CH$=$CH_2$, etc. Similarly, the term "(lower)alkynyl" as used herein means both straight and branched chain unsaturated hydrocarbon radicals of the formula —$(C_nH_{2n-3})$, wherein $n$ is a whole integer of 2 to 8, i.e., —$CH_2$—$C$≡$C$—$CH_3$, —$C$≡$C$—$CH(CH_3)_2$, etc.

The compounds of the present invention may be prepared by the process which comprises the consecutive steps of mixing together a compound having the formula

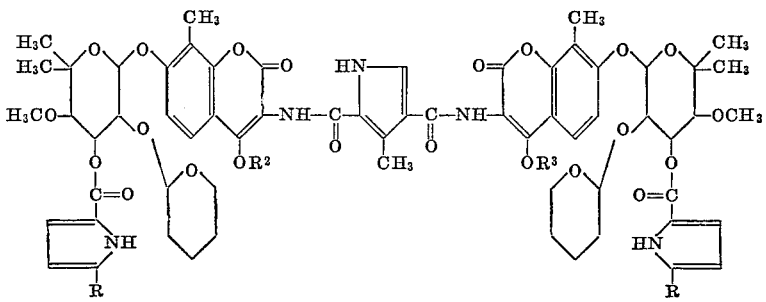

wherein R is hydrogen or methyl, and $R^2$ and $R^3$ are the same or different and are either —H or

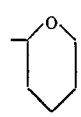

with an acid halide having the formula

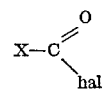

or its functional equivalent as an acylating agent in which X is a group having the formula

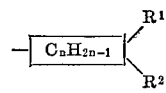

or

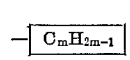

in which n is an integer of 1 to 21, m is an integer of 2 to 21, R¹ and R² are alike or different and are —H, cyclohexyl, or

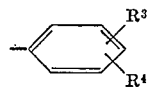

wherein R³ and R⁴ are alike or different and each represent hydrogen, fluoro, chloro, bromo, iodo, trifluoromethyl, trichloromethyl, di(lower)alkylamino, nitro, cyano, acetoxy, (lower)alkyl, (lower)alkenyl, (lower) alkynyl, (lower)alkoxy, N,N-di(lower)alkylcarboxamido, thioacetoxy, carb(lower)alkoxy or (lower)alkylthio; to produce a compound having the formula

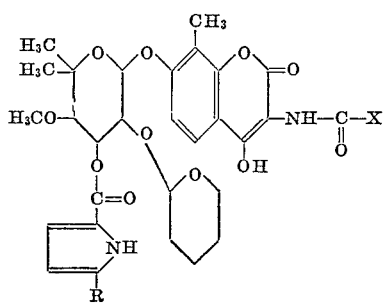

(II)

wherein R and X are as described above; and allowing said tetrahydropyranyl ether to stand in a polar solvent in the presence of a catalytic amount of an acid to produce a compound having the Formula I.

Thus mixing together a 2',2',4,4-0,0,0,0-tetratetrahydropyranylcoumermycin, or a 2',2',4-0,0,0-tritetrahydropyranylcoumermycin or a 2'2'-0,0-ditetrahydropyranylcoumermycin, or mixtures thereof, an excess of an acid halide or acid anhydride, or their functional equivalents as acylating agents for the production of N-monosubstituted amides, in a proton accepting solvent for several hours at about room temperature or at elevated temperatures produces a compound having the Formula II wherein R and X are as described above in Formula II, and subsequently allowing the above compound II to stand in a polar solvent, such as an alcohol, in the presence of a catalytic amount of an acid cleaves the tetrahydropyranyl ether linkage to produce a compound having the Formula I.

Compounds having the Formula I possess potent antibacterial activity, e.g., against *Staphylococcus aureus*. They are well absorbed and produce good blood levels upon oral or parenteral administration to mammals.

The compounds prepared by the process described above are readily modified into compounds containing moieties other than those attached to the phenyl ring of the X group referred to above in Formula I. Said compounds are also considered an integral part of the instant invention.

When compounds having Formula I contain a nitro, cyano, acetoxy, thioacetoxy

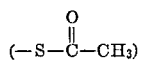

or carb(lower)alkoxy function in the X group, it is possible to change the above functions to a new species.

Mild hydrolysis of the acetoxy, thioacetoxy and carb(lower)alkoxy functions will produce X groups containing hydroxy, mercapto and carboxy functions respectively. Similarly reduction of a nitro function will produce an X group containing an amino function.

Amination of the resultant carboxy function above may produce N-substituted or unsubstituted carboxamido functions on the X group. N-alkylation of the amino function above may produce N-(lower)alkylamino or N,N-di(lower)alkylamino functions on the X group.

The compounds of the instant invention having the general Formula I all possess an acidic hydroxyl function at the 4 position of the coumarin moiety. The acidic nature of the hydroxyl allows one to readily prepare nontoxic, pharmaceutically-acceptable, cationic salts of the compounds having the Formula I, e.g., sodium, potassium, calcium, aluminum and ammonium salts and their non-toxic substituted ammonium salts with an amine selected from the group consisting of trialkylamines, procaine, dibenzylamine, N-benzyl-beta-phen-ethylamine, 1 - ephenamine, N,N' - dibenzylethylenediamine, dehydroabietylamine, N,N' - bis - dehydroabietylethylenediamine and N-(lower)alkylpiperidines, e.g., N-ethylpiperidine.

The objectives of the present invention have been achieved, by the provision according to the present invention, of the process for the synthesis of compounds having the formula

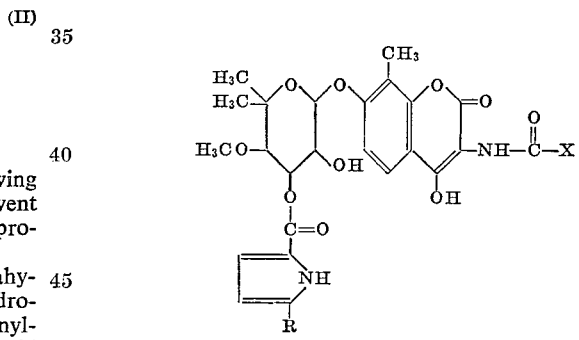

wherein R is either hydrogen or methyl, and X is a group having the formula

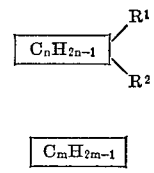

or

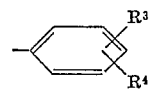

in which n is an integer of 1 to 21, m is an integer of 2 to 21, R¹ and R² are alike or different and are —H, cyclohexyl or

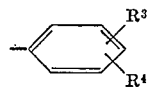

in which R³ and R⁴ are alike or different and each represents hydrogen, fluoro, chloro, bromo, iodo, trifluoromethyl, trichloromethyl, thioacetoxy, N,N-di(lower)

alkylamino, carb(lower)alkoxy, nitro, cyano, (lower)-alkyl, (lower)alkenyl, (lower)alkynyl, (lower)alkylthio, (lower)alkoxy, acetoxy or N,N-di(lower)alkylcarboxamido; which comprises the consecutive steps of:

(a) Mixing together a compound having the formula

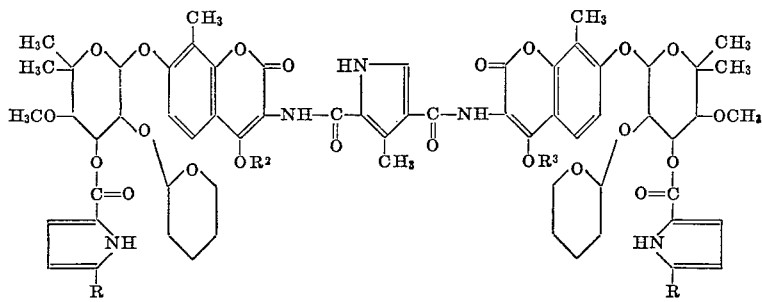

wherein R is hydrogen or methyl, and $R^2$ and $R^3$ are the same or different and are either —H or

with an acid halide having the formula

or its functional equivalent as an acylating agent, functional equivalent being more specifically defined as a compound having the formula

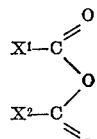

or

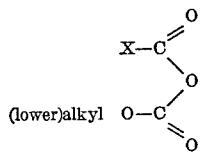

in which $X^1$ and $X^2$ are alike and are the same as X, X having been defined above; in a homogeneous or heterogeneous system capable of inactivating protons, said system comprising an inorganic or organic base selected from the group consisting of an alkali carbonate or bicarbonate, alkaline earth metal carbonate or bicarbonate, a pyridine or a tri(lower)alkylamine, alone or in combination with an inert solvent selected from the group consisting of tetrahydrofuran, benzene, toluene, xylene, ether, chloroform, etc., but preferably in a solvent system comprising a pyridine or a tri(lower)alkylamine alone or in combination with an inert solvent, at a temperature in the range of —20° C. to 150° C., but preferably in the range of —5° C. up to the boiling point of the solvent system used, to produce a compound having the formula

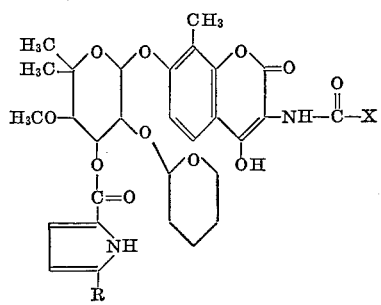

wherein R and X are as described above.

(b) Allowing said tetrahydropyranyl ether to stand, preferably in homogeneous solution, in a (lower)alkanol solvent, i.e., methanol, ethanol, etc., or in a co-solvent system containing an alcohol, with or without the aid of heat, but preferably at a temperature in the range of 0° C. up to the boiling point of the solvent system used, in the presence of a catalytic amount of an acid selected from the group consisting of mineral acids, arylsulfonic acids, Lewis acids, acid resins, activated carboxylic acids, or alkylsulfonic acids, but preferably arylsulfonic acids, to produce a compound of the present invention having the formula

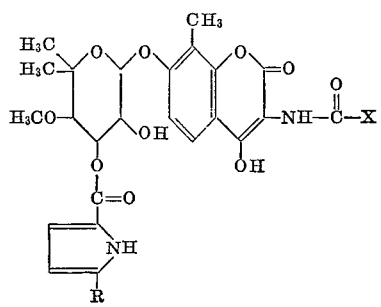

wherein R and X are as described above.

In the preferred embodiments of the present invention R is as defined above, and is especially methyl.

The process can be conducted under varying conditions, the most critical being the temperature at which the acylative step is performed. When lower temperatures in the range of —25 to 25° C. are employed, it is possible to isolate intermediates from the process that are not isolated when the process is conducted at higher temperatures, these intermediates being readily convertible to the desired N-acyl derivative by the use of heat and an organic nucleophile such as pyridine.

The process, at temperatures in the range of —25 to 25° C., is usually performed by dissolving or suspending 2',2',4,4 - 0,0,0,0 - tetratetrahydropyranylcoumermycin, or 2',2',4 - 0,0,0 - tritetrahydropyranylcoumermycin or 2',2' - 0,0 - ditetrahydropyranylcoumermycin, or mixtures thereof, in a proton accepting solvent (organic nucleophile) usually selected from the group consisting of a pyridine, or (lower)trialkylamine such as trimethylamine, triethylamine, or one of these in combination with an inert solvent, an example of which may be tetrahydrofuran, benzene, toluene, xylene, chloroform, or ether. The mixture is cooled to about 10° C. by an ice-water bath. An excess of an unsubstituted or substituted acid halide or acid anhydride, or its functional equivalent, preferably in a ratio of two to four moles of acylating agent to one mole of coumermycin tetrahydropyranyl ether, is added with vigorous stirring. Stirring is maintained for several hours following which the solution is concentrated to a syrup by evaporation in vacuo at temperatures below 25° C. The material isolated by this technique is characterized as a bis-imide, having the formula

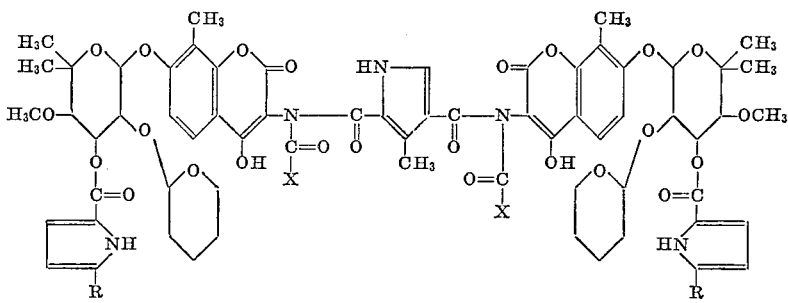

wherein R is hydrogen or methyl and X is as defined above.

Warming the isolated bis-imide in a water-wet proton-accepting organic solvent from the group described above at 50° C. overnight, or by refluxing in said solvent for a minimum time of three hours, results in the formation of compounds having the Formula II.

Mixing the above compound II in a polar solvent such as a (lower)alkanol, i.e., methanol, ethanol, propanol, etc., in the presence of a catalytic amount of an acid, with or without the aid of heat, produces compounds having the Formula I.

The addition of a suitable acid is necessary to catalyze the cleavage of the tetrahydropyranyl group from compound II. The acid employed is usually selected from one of the following groups:

(1) Concentrated mineral acids such as sulfuric acid, phosphoric acid, phosphorous acid, and hydrochloric acid.

(2) Arylsulfonic acids having the following formula

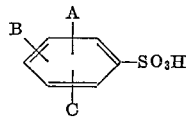

in which each of A, B and C are alike or different and are hydrogen, halogen, (lower)alkyl, (lower)alkoxy, nitro, aryl, or cyano.

(3) Lewis acids such as $SnCl_4$, $AlCl_3$, $BF_3$, $ZnCl_2$, $FeCl_3$.

(4) Acid resins in their acidic form ($H^+$) such as the phenolic sulfonic acids, polystyrene sulfonic acids, polystyrene phosphorous acids, polystyrene phosphonic acids, acrylic carboxylic acids, polystyrene nuclear sulfonic acids, methacrylic carboxylic acid, and in particular macroreticular polystyrene sulfonic acid ("amberlyst 15"—Rohm and Haas).

(5) Activated carboxylic acids such as $F_3C-CO_2H$, $F_2CHCO_2H$,

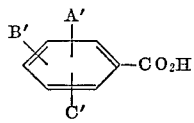

wherein A', B' and C' are alike or different but are nitro, fluoro, cyano or hydrogen.

(6) Alkylsulfonic acids having the formula $R-(CH_2)_xSO_3H$, wherein R is selected from the group consisting of aryl, substituted aryl, (lower)alkyl, substituted (lower)alkyl; and where X is a whole integer of 0 to 6 inclusive.

The process, at temperatures above 25° C., and up to the boiling point of the solvent employed, is usually performed by dissolving or suspending 2',2',4,4-0,0,0,0-tetratetrahydropyranylcoumermycin, or 2',2',4-0,0,0-tri-tetrahydropyranylcoumermycin, or 2',2'-0,0-ditetrahydropyranylcoumermycin, or mixtures thereof in a proton accepting solvent (organic nucleophile) usually selected from the group consisting of a pyridine, or (lower) trialkylamine such as trimethylamine, triethylamine; or one of these in combination with an inert solvent, an example of which may be, tetrahydrofuran, benzene, toluene, xylene, chloroform or ether.

An excess of an unsubstituted or substituted alkane or alkene acid halide or acid anhydride, or its functional equivalent, preferably in a ration of two to four moles of acylating agent to one mole of courmermycin tetra-hydropyranyl ether, is added to the tetrahydropyranyl ether mixture with vigorous stirring. The resultant mixture is slowly warmed to temperatures up to the boiling point of the solvent employed for a period of time usually in excess of thirty minutes but rarely longer than 40 hours, during which time the solution turns orange to brown in color. The solution is evaporated in vacuo to a syrup and poured into vigorously stirred ice-water. The crystalline product collected is characterized as a mixture consisting of material of Formula II, in addition to lesser quantities of material characterized as having the formulas

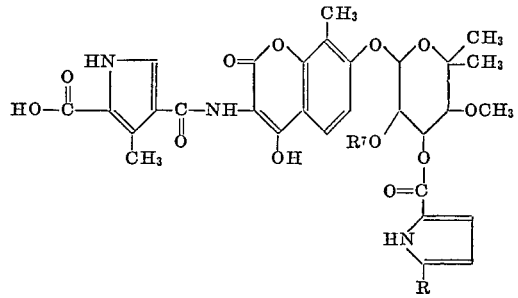

and/or

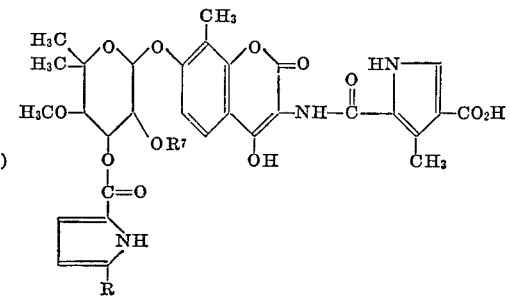

(IV)

and

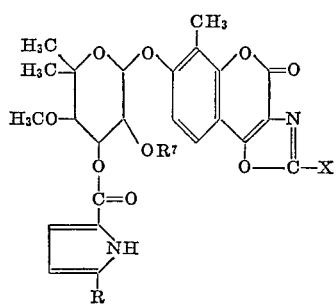

(V)

wherein R is hydrogen or methyl, $R^7$ is hydrogen or

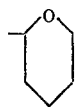

and X is as defined above.

The mixture is subsequently separated to its component parts by fractional crystallization, chromatography or some other equivalent method. The material of Formula II is then dissolved in a polar solvent such as a (lower)alkanol, i.e., methanol, ethanol, propanol, etc., in the presence of a catalytic amount of an acid from the group described previously, with or without the aid of heat, to produce a compound of Formula I.

While the acylative cleavage proceeds readily by both of the above detailed procedures, it has been observed that the process proceeds most readily with the highest percentage yields of desired product and with the lowest quantity of decomposition products, i.e., oxazole formation and color, when a small quantity of water is added to the mixture of the coumermycin tetrahydropyranyl ether just prior to the addition of the acylating agent. Furthermore, it has been observed that when the ratio of acylating agent to coumermycin tetrahydropyranyl ether is kept below 5:1, the quantity of oxazole, V, formed is kept minimal.

The compounds of the present invention can also be prepared by alternative procedures:

(1) Direct acylation of 3-amino-4-hydroxy-8-methyl-7 - [3-0 - (5-methyl - 2-pyrrolylcarbonyl)noviosyloxy] coumarin

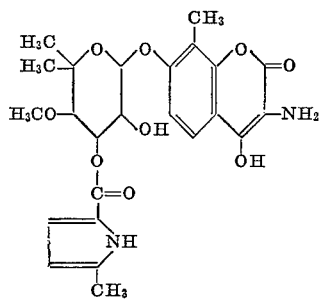

(VI)

is dissolved in pyridine and acylated directly using a small molar excess of the appropriate acylating agent having the formula

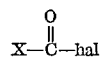

in which X is as described above and hal is a halogen such as chloro, bromo or iodo; or its functional equivalent, to produce the compounds of the present invention.

The resultant products of the instant invention described herein have been found to exist in various states of hydration, i.e., anhydrous, monohydrated, and polyhydrated. For the purpose of the disclosure, the invention is considered to embody all such forms as an integral part of same.

The tetrahydropyranyl ethers of coumermycin $A_1$ and $A_2$ described herein do not form part of the present invention. They are the invention of our colleague Donald Edward Nettleton, Jr. and are disclosed and claimed in his application Ser. No. 583,992 filed Oct. 3, 1966.

The assay used in the examples below is a modified coumermycin $A_1$ assay which is run on Petri plates prepared by using ten ml. of Baltimore Biological Laboratories (BBL) base agar and a top layer of four ml. of BBL seed agar inoculated with Staph. aureus ATCC 6538 P. The plates are incubated for 18 hours at 30° C. The compound used as the standard for the assay of the compounds of the present invention is 3-benzamido-4-hydroxy-8-methyl-7-[3-0-(5 - methyl-2-pyrrolylcarbonyl) noviosyloxy]coumarin (BL–C3, VI) and it is assigned an activity value of 1000 mcg./mg. All values for the compounds of the present invention are expressed in terms of BL–C3 units.

Compound VI and its preparation as described in the subsequent examples do not constitute part of the present invention. It is a part of our invention which is disclosed and claimed in our co-pending application, Ser. No. 624,153, filed Mar. 20, 1967.

The compounds of the present invention are active against a wide variety of gram-positive and some gram-negative bacteria. They are most effective when administered parenterally as it is possible to achieve the highest blood levels by this route. Significantly however, the compounds of the invention are also effective when administered orally. In particular, the compound, 3-isobutyramido-4-hydroxy-8-methyl - 7 - [3-0-(5-methyl-2-pyrrolylcarbonyl)noviosyloxy]coumarin (BL–C43) gives good and prolonged blood levels when administered orally to dogs. Table I illustrates comparative blod levels for BL–C43 as compared to novobiocin:

TABLE I
BL–C43

| Dog Number | Blood Levels (µg./ml.) Hours After Administration | | | | | Dose, mg./kg. |
|---|---|---|---|---|---|---|
| | 1 | 2 | 4 | 7 | 24 | |
| 1 | 26 | 33 | 35 | 14 | 1.4 | 25 |
| 2 | 45 | 40 | 36 | 14 | 1.6 | 25 |
| 3 | 52 | 59 | 36 | 14 | 3.1 | 25 |
| 4 | 48 | 52 | 34 | 13 | <1.0 | 25 |
| Average | 43 | 46 | 35 | 14 | | |
| Novobiocin | | | | | | |
| 1 | 39 | 80 | 37 | 6.4 | <0.6 | 25 |
| 2 | 76 | 80 | 36 | 4.4 | <0.6 | 25 |
| 3 | 90 | 82 | 38 | 7.4 | <0.6 | 25 |
| 4 | 88 | 82 | 46 | 8.8 | 1.9 | 25 |
| 5 | 78 | 93 | 31 | 7.5 | <0.6 | 25 |
| Average | 74 | 83 | 38 | 6.9 | | |

In the treatment of bacterial infections in animals, including man, the compounds of the present invention are administered orally or parenterally in doses of about 5 mg./kg./day to about 125 mg./kg./day, but preferably about 5 mg./kg./day to 50 mg./kg./day.

In the treatment of bacterial infections in man, it is most preferred to administer the compounds of the present invention in doses of 100 mg. to 500 mg. three to four times a day.

PREPARATION OF THE TETRAHYDROPYRANYL ETHERS OF COUMERMYCIN $A_1$ OR $A_2$

Pure coumermycin $A_1$ or coumermycin $A_2$ is mixed together with excess dihydropyran in the presence of an acid catalyst and an inert solvent to yield mixtures of mono, di, tri and tetra-tetrahydropyranyl ether derivatives of coumermycin $A_1$ or $A_2$ respectively.

More specifically, a coumermycin is mixed together with dihydropyran in various molar proportions, but preferably in a ratio of one mole of coumermycin to more than 20 moles of dihydropyran.

The addition of a suitable acid to the coumermycindihydropyran mixture as a catalyst is essential. The acid employed is usually selected from the group consisting of those previously mentioned in the tetrahydropyranyl ether cleavage step.

The quantity of the acid employed as the catalyst is usually determined by the reaction conditions, the bulk of the catalyst and the amount at which the optimum yield of product is obtained.

The reaction may be conducted with or without the use of a co-solvent, the co-solvent usually being employed to increase the solubility of the reactants and reduce the viscosity of the mixture. The co-solvents used is inert and is usually selected from the group consisting of tetrahydrofuran, dioxane, diethyl ether, the dipropyl ethers, the dibutyl ethers, benzene, xylene and toluene.

The reaction is exothermic. Its temperature can be carefully controlled or it can be allowed to seek its own level without substantial differences in the end result. The process is usually conducted at a temperature of 0°–100° C., but preferably in the temperature range of 25° to 60° C. for a period of time dependent upon the temperature used and ultimately upon the completion of reaction and the yields obtained.

As mentioned previously, the process usually results in the formation of mixtures of mono, di, tri and tetra- substituted tetrahydropyranyl ether derivatives of the coumermycins. The ratio of the components of the mixture however, is largely dependent upon the reaction conditions, and most particularly the method of work-up and purification of same.

When the reaction is conducted at elevated temperatures of 60–80° C. for 2 to 4 hours, or at lower temperatures for longer periods of time, under very anhydrous conditions, followed by purification in the absence of polar solvents, there is obtained a product consisting of 80 to 99% pure 2',2',4,4-0,0,0,0-tetratetrahydropyranylcoumermycin. The other possible tetrahydropyranylcoumermycins are usually found in the following order of their relative concentration: 2',2',4-0,0,0-tritetrahydropyranyl >2',2'-0,0 - ditetrahydropyranyl>2' - 0 - monotetrahydropyranyl>coumermycin.

When the reaction is conducted at lower temperatures, or for shorter periods of time, or under conditions not as anhydrous, the proportion of the 2',2',4,4-0,0,0,0-tetratetrahydropyranylcoumermycin in the mixture decreases as the proportion of the other tetrahydropyranyl ethers increases.

It is a fact that the tetrahydropyranyl moiety attached to either or both 4-0-positions of the coumermycin molecule is quite labile in the presence of polar solvents. When 2',2',4,4-0,0,0,0 - tetratetrahydropyranylcoumermycin or 2',2',4-0,0,0-tritetrahydropyranylcoumermycin is crystallized or recrystallized from a hot alcoholic solvent system, the 4-0-tetrahydropyranyl ether functions are cleaved to 4-hydroxyl functions to yield pure 2',2'-0,0-ditetrahydropyranylcoumermycin. The 2'-0 - tetrahydropyranyl ether functions are generally stable when crystallization is carried out in the absence of acidic materials.

Resolution of mixtures of the tetrahydropyranyl ether derivatives can be accomplished by counter-current distribution purification. As a practical matter, the material is suitable as a mixture of di, tri and tetra-tetrahydropyranylcoumermycin, or it can be crystallized from a hot alcoholic solvent system to yield pure 2',2'-0,0-ditetrahydropyranylcoumermycin, for use as an intermediate in its ultimate conversion to the N-acyl cleavage products of the present invention.

In the instant invention, use of the word coumermycin, without specifically stating coumermycin $A_1$ or $A_2$, shall be taken to mean either Coumermycin $A_1$ or $A_2$.

Di-, tri-, and tetra-tetrahydropyranylcoumermycin $A_1$ mixture and its resolution Coumermycin $A_1$ was stirred with tetrahydrofuran (THF) at room temperature until dissolution occurred. Dihydropyran (DHP) was added followed by Amberlyst 15 (H+) resin (containing less than 0.5% $H_2O$). As stirring continued, additional DHP was added. A gel formed that redissolved after one to two hours. Stirring was continued overnight at room temperature during which time the solution darkened to an orange-brown color.

The Amberlyst resin was removed by filtration and the solution concentrated in vacuo to a syrup. Dilution of the syrup with a minimal quantity of methanol yielded a crude solid (85–95% of theory). The solid was dried in vacuo. Thin layer chromatography indicated the solid consisted of at least three zones ($R_f$ 0.60–0.70) when resolved using 9:21:8 (parts by volume) of methyl acetate: 2-propanol:concentrated $NH_4OH$.

A Craig counter-current distribution separation was run on a 15 g. sample of the mixture using ½ volume upper phase to 1 volume lower phase from a system of 5:1:5:1 of $CCl_4$:$CHCl_3$:$CH_3OH$:$H_2O$ over 1001 transfers, 97.5% of the solid being recovered in total. The recoveries by evaporation and subsequent crystallization from the major concentrations as determined by ultraviolet absorption at 345 m$\mu$ were as follows:

2',2',4,4-0,0,0,0-tetratetrahydropyranylcoumermycin $A_1$

The tetra-substituted tetrahydropyranyl ether of coumermycin $A_1$ was recovered from tubes 21 through 40 as a pure crystalline solid, 3.68 g., M.P. decomposition above 200°.

Analysis.—calcd. for $C_{75}H_{91}N_5O_{24}$: C, 62.27; H, 6.34; N, 4.84. Found: C, 62.03; H, 6.31; N, 4.94.

2',2',4-0,0,0-tritetrahydropyranylcoumermycin $A_1$

The tri-substituted tetrahydropyranyl ether of coumermycin $A_1$ was recovered from tubes 41–70 as a pure crystalline solid, 3.8 g., M.P. decomposition above 200° C.

Analysis.—calcd. for $C_{70}H_{83}N_5O_{23}$: C, 61.71; H, 6.14; N, 5.14. Found: C, 61.65; H, 6.19; N, 5.34.

2'2',-0,0-ditetrahydropyranylcoumermycin $A_1$

The di-substituted tetrahydropyranyl ether of coumermycin $A_1$ was recovered from tubes 71–100 as a pure crystalline solid, 1.8 g., M.P. decomposition above 200° C.

Analysis.—calcd. for $C_{65}H_{75}O_{22}N_5$: C, 61.06; H, 5.91; N, 5.47. Found: C, 61.00; H, 5.83; N, 5.56.

2'-0-monotetrahydropyranylcoumermycin $A_1$

The mono-substituted tetrahydropyranyl ether of coumermycin $A_1$ was recovered from tubes 101–130 as a pure crystalline solid, 1.6 g., M.P. decomposition above 200° C.

Analysis.—calcd. for $C_{60}H_{65}N_5O_{21}$: C, 60.35; H, 5.66; N, 5.86. Found: C, 60.42; H, 5.81; N, 5.83.

Coumermycin $A_1$ was recovered unreacted from tubes 300–499, 1.5 g., M.P. decomposition 240–245° C.

2',2'-0,0-ditetrahydropyranylcoumermycin $A_1$ (direct method)

Coumermycin $A_1$ (1110.06 g., 1.0 mole) was slurried in a mixture of 11.2 liters of dry THF and 11.2 liters of dry DHP. p-Toluenesulfonic acid monohydrate (2.2 g.) was added and the solution was stirred for twenty hours at room temperature. The solution was concentrated to ⅓ of the volume in vacuo at less than 40° C., filtered and the filtrate poured into 134 liters of dry methanol at 0° C. The product crystallized upon stirring for 30 minutes at 0–5° C. and was collected by filtration. The filter cake was covered by dry solvent at all times while washing same with 10 liters of dry, cold methanol, followed by 5 liters of petroleum ether.

Recrystallization from hot methanol yielded the desired 2′,2′-0,0-ditetrahydropyranyl ether.

PREPARATION OF ACYLATING AGENTS

The acylating agents employed in the process of the instant invention were prepared, when not available commercially, from the corresponding benzoic acid derivative by generally known procedures.

(a) The acid halides were prepared by mixing together the acid with thionyl halide, with or without the aid of heat, followed by purification by distillation or by crystallization from an inert solvent, i.e., benzene, "Skellysolve B" (petroleum solvent, essentially n-hexane, B.P. 60–80° C.).

(b) The acid anhydrides were prepared by mixing together the acid with acetic anhydride, with or without the aid of heat, usually followed by purification by crystallization from an inert solvent, i.e., benzene, "Skellysolve B," ethyl acetate, etc.

(c) The mixed acid anhydrides were prepared by mixing together the acid with ethyl chloroformate in the presence of pyridine with or without the aid of heat, usually followed by "in situ" use on the desired tetrahydropyranyl-coumermycin $A_1$ or $A_2$.

These methods work in the preparation of a wide variety of benzoic acid acylating agents as is exemplified in the examples of the instant invention.

The following examples will serve to illustrate but not to limit the present invention. In the *Staphylococcus aureus* plate assays referred to below, the standard was 3-benzamido - 4 - hydroxy - 8 - methyl - 7 - [3 - 0 - (5 - methyl-2 - pyrrolylcarbonyl)noviosyloxy]coumarin having an assigned potency of 1000 mcg./mg. against *Staphylococcus aureus* ATCC 6538P.

DESCRIPTION OF THE PREFERRED EMBODIMENT

EXAMPLE I 3-isobutyramido-4-hydroxy-8-methyl-7-[3-0-(5-methyl-2-pyrrolylcarbonyl)noviosyloxy]coumarin

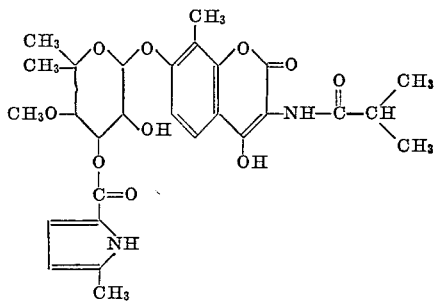

Fifty grams of 2,2′-ditetrahydropyranyl coumermycin $A_1$ (39.11 millimoles) was dissolved in 600 ml. of tetrahydrofuran at 25° C. with stirring. Five equivalents of triethylamine (19.7 g., 27.15 ml.; 195.5 millimoles) were added along with 4 equivalents of iso-butyric anhydride (24.7 g., 26.05 ml.; 156.4 millimoles) at 25° with continued stirring. The mixture was heated at reflux (65° C.) for 7–8 hours.

The reaction mixture was evaporated in vacuo to approximately 200 ml. and poured directly into 2000 ml. of vigorously stirred Skellysolve-B. The white solid was filtered, washed with Skellysolve-B, and dried. Yield: 72 grams.

This imide mixture was dissolved in 1440 ml. (20 ml./gram) of pyridine and stirred in an oil bath at 55–60° C. for 24–36 hours. The pyridine was concentrated in vacuo to a volume of approximately 200–300 ml. and poured into 3000 ml. of vigorously stirred ice water. The pH was adjusted to 1.5 using 6 N hydrochloric acid. After stirring for 30–45 minutes, the solids were vacuum filtered, washed with water and dried. Yield: 65–70 grams.

The crude amide mixture was dissolved in 1400–1500 ml. methanol with stirring and sufficient acetone added (approximately 150 ml.) to give a clear solution. 14.0 grams (20% of 1 equivalent) of p-toluenesulfonic acid monohydrate was added and the reaction mixture stirred at 25° C. for 48 hours.

The reaction solution was filtered to remove insoluble material, and the supernatant concentrated in vacuo to approximately ⅓–½ volume (filtration at this point is recommended if necessary). The concentrate was poured into 3000 ml. of water with vigorous stirring, and after 30–45 minutes the solids were vacuum filtered, washed with water and dried. Recovery: approximately 35 grams.

These solids were dissolved in 1500 ml. of hot ethyl acetate and filtered to remove any insoluble material. The ethyl acetate solution was extracted with 1 × 1000 ml. and 2 × 500 ml. of 5% aqueous sodium bicarbonate solution.

The ethyl acetate fraction contained the desired title product. After drying over anhydrous sodium sulfate and evaporating to about 300–500 ml., fractional precipitation with Skellysolve-B yielded 4.5–5.0 grams of white, crystalline product.

M.P. (Mel-Temp, uncorrected): 173–175° C. with effervescence. Plate assay: 450 units (BL–C3).

*Analysis.*—Calculated for: $C_{28}H_{34}O_{10}N_2$: C, 60.20; H, 6.14; N, 5.01. Found: C, 60.15; H, 6.31; N. 4.80.

EXAMPLE 2

3-(N-benzoyl-β-alanyl)-4-hydroxy-8-methyl-7-[3-O-(5-methyl-2-pyrrolylcarbonyl)noviosyloxy]coumarin One gram (2.05 mmoles) of 3-amino-4-hydroxy-8-methyl-7-[3-O-(5-methyl - 2 - pyrrolylcarbonyl)noviosyloxy]coumarin (PNC=$NH_2$) was dissolved in 20 ml. of acetone. To this was added 0.31 gram (3.06 millimoles; 0.43 ml.) of triethylamine, and the solution cooled at 0–5° C.

A solution of 0.735 gram (4.1 millimoles, equivalent to a 2 molar excess) of N-benzoyl β-alanine in 20 ml. acetone was prepared and cooled at 0–5° C. To this was added 0.752 gram (7.43 millimoles, 1.04 ml.) of triethylamine, followed by 0.673 gram (6.20 millimoles; 0.59 ml.) of ethyl chloroformate with continued cooling and agitation at 0–5° C. Upon addition of the ethyl chloroformate, there was an immediate heavy, white precipitate. Therefore, 2.0 ml. of water was added to solubilize the precipitate and stirring was continued at 0–5° C. for forty-five minutes.

Then the solution of PNC=$NH_2$ was added carefully to the mixed anhydride at 0–5° C., and stirring continued at this temperature for one hour. The reaction mixture was then stirred at 25° C. for two hours.

The reaction mixture was poured into 500 ml. of ice-water with vigorous stirring and adjusted to pH approximately 1–2 with 6 N-hydrochloric acid. After one hour, the solids (light lilac colored) were filtered, washed with water and dried. Recovery (crude): 1.123 grams.

Fractional recrystallization from ethyl acetate/Skellysolve-B afforded 562 mg. of pure product.

*Analysis.*—Calcd. for $C_{34}H_{37}O_{11}N_3 \cdot \tfrac{1}{2}H_2O$: C, 60.71; H, 5.69; N, 6.25. Found: C, 60.68; H, 6.05; N, 6.09.

The infrared (IR) spectrum and the nuclear magnetic resonance (NMR) spectrum were consistent for the title compound. Plate assay: 50 units (BL–C3).

EXAMPLE 3

3-(3,3-dimethylbutyramido)-4-hydroxy-8-methyl-7-[3-O-(5-methyl-2-pyrrolylcarbonyl)noviosyloxy]coumarin A solution of 10.81 ml. (10.53 g.; 78.2 millimoles) of 3,3-dimethylbutyryl chloride in 45 ml. of tetrahydrofuran was added dropwise, slowly to a stirred solution of 25.0 g. (19.55 millimoles) di-tetrahydropyranyl coumermycin $A_1$ in 500 ml. pyridine at 25° C. The reaction mixture was stirred at 25° C. for 94 hours. The reaction mixture was poured directly into 2500 ml. of stirred ice water, pH adjusted to 1.5 with 6 N HCl and the aqueous mixture stirred 1 hour. The solid was then vacuum filtered, washed with water and dried. The dried solids were redissolved in 750 ml. of pyridine, placed in an oil bath at 55 to 60° C., and stirred at this temperature for 24 hours. The reaction mixture was concentrated in vacuo to a syrup, slurried several times with acetone and concentrated in vacuo again to a syrup. The solid was redissolved in 300 ml. of acetone and 1000 ml. of methanol, 6.0 g. of p-toluenesulfonic acid was added and the mixture was stirred at 25° C. for twenty-four hours. The reaction mixture was vacuum filtered, the supernatant concentrated in vacuo to ⅓ volume and poured into 2500 ml. of vigorously stirred water. After stirring for forty-five minutes, the product was vacuum filtered, washed with water and dried, recovering 17.2 grams. The crude material was dissolved in 400 ml. of hot ethyl acetate and filtered to remove any insoluble material. The ethyl acetate solution was extracted with 4× 500 ml. of 5% aqueous $NaHCO_3$ solution. The solution was dried over anhydrous $Na_2SO_4$ and concentrated in vacuo to dryness. The solid was redissolved in 60 ml. of $CHCl_3$ and was fractionally precipitated with n-hexane to recover 6 solid fractions. Fractions 5 and 6 indicated strong peaks in the infrared spectra at 2950 cm. for $(CH_3)_3$ and/or the tetrahydropyranyl protecting group. Fractions 5 and 6 were again redissolved in 200 ml. methanol with 500 mg. p-toluenesulfonic acid and were stirred at 25° C. for 24 hours. The solution was then poured into 700 ml. of stirred water, vacuum filtered, washed with water and dried to yield 2.0 g. of solid. The solid was redissolved in 40 ml. $CHCl_3$ and fractionally precipitated with n-hexane to recover four fractions. The last fraction totalling 1.15 g. assayed 950–1100 BL–C3 units.

*Analysis.*—Calcd. for $C_{30}H_{38}O_{10}N_2$: C, 61.42; H, 6.53; N, 4.77. Found: C, 61.50; H, 6.62; N, 4.83.

The IR spectrum and the NMR spectrum are consistent with the title structure.

EXAMPLE 4

3-(3-methyl-2-butenamido)-4-hydroxy-8-methyl-7-[3-O-(5-methyl-2-pyrrolylcarbonyl)noviosyloxy]coumarin A solution of 4.64 grams (39.12 millimoles) of 3,3-dimethylacryloylchloride and 50 ml. of tetrahydrofuran were added dropwise to a stirred solution of 25.0 grams (19.56 millimoles) of di-tetrahydropyranylcoumermycin $A_1$ in 500 ml. pyridine at 25° C. Upon completion of addition of tetrahydrofuran solution, the reaction mixture was refluxed at 115° C. for one hour. After cooling at room temperature 30 to 45 minutes, the reaction mixture was poured directly into 2500 ml. of stirred ice water, the pH was adjusted to 1.5 with 6 N HCl and was stirred for one hour. The mixture was vacuum filtered, washed with water and dried. The material was redissolved in 800 ml. pyridine and was stirred in an oil bath at 50 to 60° C. for 25 hours, concentrated in vacuo to ⅓ volume, slurried several times with acetone, and concentrated each time in vacuo to dryness. The syrup was redissolved in 600 ml. of acetone and 1400 ml. of methanol. Seven grams of p-toluenesulfonic acid was added and the solution was stirred at 25° C. for 72 hours. The solution was then concentrated in vacuo to approximately ½ volume and filtered into 2500 ml. of stirred water. After stirring for 30 minutes, the solid was vacuum filtered, washed with water and dried. The dried solid was redissolved in 500 ml. of hot ethyl acetate and filtered to remove the ethyl acetate insoluble material. The ethyl acetate solution was extracted with 5× 500 ml. of 5% aqueous $NaHCO_3$ solution and then dried over anhydrous $Na_2SO_4$. The solution was concentrated in vacuo to dryness, redissolved in 200 ml. of hot ethyl acetate and filtered to remove an insoluble portion. The ethyl acetate was fractionally precipitated with n-hexane to recover five fractions. The third fraction, totalling 780 mg. was the title product.

*Analysis.*—Calcd. for $C_{29}H_{34}O_{10}N_2$: C, 61.04; H, 6.01; N, 4.91. Found: C, 61.27; H, 6.36; N, 4.56.

The IR spectrum and NMR spectrum are consistent with the title structure.

EXAMPLE 5

3 - (2 - butenamido) - 4 - hydroxy - 8 - methyl - 7 - [3 - 0-(5-methyl-2-pyrrolylcarbonyl)noviosyloxy]coumarin A solution of 6.55 g. (62.6 millimoles) of crotonylchloride in 50 ml. of tetrahydrofuran was added dropwise to a stirred solution of 20.0 g. (15.65 millimoles) of di-tetrahydropyranyl coumermycin $A_1$ in 400 ml. of pyridine at 25° C. The reaction mixture was stirred for 70 hours at 25° C. The reaction mixture was concentrated in vacuo to approximately ⅓ volume and was poured into 2000 ml. of stirred ice water. The pH was adjusted to 1.5 with 6 N HCl. The mixture was stirred for one hour, vacuum filtered, washed with water and dried. The 28.0 g. of crude material was dissolved in 560 ml. of pyridine and was stirred in an oil bath at 50–60° C. for 24 hours. The solution was concentrated in vacuo to a thick syrup, slurried with acetone and evaporated to dryness several times in vacuo. The solid was redissolved in 250 ml. acetone and 1000 ml. methanol. 5.6 g. (20%) of p-toluenesulfonic acid was added and the solution stirred at 25° C. for twenty-four hours. The solution was concentrated in vacuo to ½ volume and filtered into 2000 ml. of stirred water. After stirring one hour, the material was vacuum filtered, washed with water and dried to yield 15.7 g. of solid. The solid was redissolved in 500 ml. of hot ethyl acetate. The ethyl acetate insoluble material was removed by filtration. The ethyl acetate solution was extracted with 4× 500 ml. of 5% aqueous $NaHCO_3$ solution. The ethyl acetate solution was dried over anhydrous $Na_2SO_4$, filtered and concentrated in vacuo to dryness and redissolved in 100 ml. of hot $CHCl_3$. The solution was filtered to remove any $CHCl_3$ insoluble material and then fractionally precipitated with Skellysolve-B to yield four fractions. The third fraction totalling 526 mg. was the title product.

*Analysis.*—Calcd. for $C_{28}H_{32}O_{10}N_2$: C, 60.42; H, 5.80; N, 5.03. Found: C, 60.64; H, 5.92; N, 4.80.

The IR spectrum and the NMR spectrum were consistent for title compound. Plate assay: 730 BL–C3 units.

EXAMPLE 6

3 - undecanamido - 4 - hydroxy - 8 - methyl - 7 - [3 - 0-(5-methyl-2-pyrrolylcarbonyl)noviosyloxy]coumarin $PNC-NH_2$ (500 mg.) was dissolved in 15 ml. of pyridine at 25° C. A 1.5 molar excess (314.5 mg., 1.536 millimoles) of undecanoyl chloride in 2.0 ml. of tetrahydrofuran was added directly to the stirring $PNC-NH_2$ solution at 25° C. The solution was stirred at room temperature for about 20 hours.

The solution was poured into 600 ml. of vigorously stirred ice-water. The pH was adjusted to 1.5 with 6 N HCl and stirred for about 20 minutes. The resultant solid was collected by filtration followed by washing and drying, to yield 589 mgs. of solid. The solid was redissolved in 10 ml. of ethyl acetate and was saturated to turbidity with n-hexane. The solids were collected and discarded. The procedure was repeated again. The filtrate was supersaturated with n-hexane and these solids were collected to yield 347 mg. of solid determined to be the title compound, M.P. 209–210° C. Plate assay: 63 BL–C3 units.

*Analysis.*—Calcd. for $C_{35}H_{48}O_{10}N_2$: C, 64.01; H, 7.37; N, 4.26. Found: C, 63.62; H, 6.99; N, 4.63.

The IR spectrum and NMR spectrum were consistent for the title compound.

EXAMPLE 7

3 - [3 - (3 - n - butyl - 4 - hydroxyphenyl)propionamido]- 4 - hydroxy - 8 - methyl - 7 - [3 - 0 - (5 - methyl - 2 - pyrrolylcarbonyl)noviosyloxy]coumarin (A) 3 - [(4 - hydroxy - 3 - α - methylallyl) - 3 - phenylpropionamido] - 1 - 4 - hydroxy - 8 - methyl - 7 - [3 - 0 - (5 - methyl - 2 - pyrrolylcarbonyl)noviosyloxy]coumarin (4.9 grams) was dissolved in 200 ml. of absolute ethanol. To this solution was added 550 mg. of 5% palladium on charcoal. The solution was hydrogenated on a Parr hydrogenerator at hydrogen pressure of 53 lbs./in.$^2$. The solution was shaken for 18 hours during which time the hydrogen uptake was 15 lbs./in.$^2$. The solution was filtered and the ethanol then evaporated in vacuo.

(B) The residue from A was dissolved in liquid ammonia. After the ammonia was allowed to evaporate the brown residue was dissolved in 250 ml. of hot water. The insoluble solids were collected by filtration to yield 3.23 grams. This solid was dissolved in 50 ml. of ethyl acetate and filtered. The filtrate was diluted with n-hexane to turbidity. The resultant solids were collected as separate fractions. The n-hexane dilution was repeated three more times for a total of four fractions. The solvent was evaporated from the filtrate to yield fraction 5. This fraction was determined to be the title product, M.P. 130–135° C.

*Analysis.*—Calcd. for $C_{37}H_{44}O_{11}N_2$: C, 64.15; H, 6.40; N, 4.04. Found: C, 64.13; H, 6.62; N, 4.37.

EXAMPLE 8

Many compounds of the present invention have been prepared by utilizing the various procedures of the foregoing examples. Substitution in the procedures indicated of the appropriate acylating agent produces the compounds having the formula:

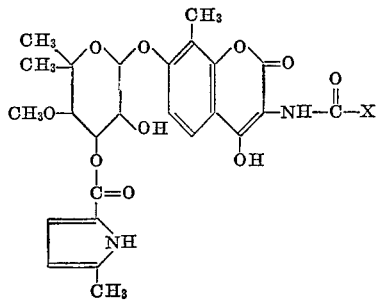

SEMI-SYNTHETIC ALIPHATIC COUMERMYCIN DERIVATIVES

| X | Example | BL-C3 Assay | M.P., Degrees | Analysis for— |
|---|---|---|---|---|
| —CH$_3$ | 3, 4, 5 | 200 | 256 | $C_{26}H_{30}O_{10}N_2$: Calcd.: C, 58.86; H, 5.70; N, 5.28. Found: C, 59.04; H, 5.91; N, 5.34. |
| —CH$_2$—C$_6$H$_5$ | 1, 5 | 120 | 120 | $C_{32}H_{34}O_{10}N_2$: Calcd.: C, 63.36; H, 5.65; N, 4.61. Found: C, 63.78; H, 5.74; N, 4.26. |
| —CH(CH$_3$)$_2$ | 1, 3 | 700 | 173 | $C_{28}H_{34}O_{10}N_2$: Calcd.: C, 60.20; H, 6.14; N, 5.01. Found: C, 60.15; H, 6.31; N, 4.80. |
| —CH$_2$CH$_3$ | 1, 3 | 440 | 247 | $C_{27}H_{32}O_{10}N_2$: Calcd.: C, 59.55; H, 5.92; N, 5.14. Found: C, 59.24; H, 6.06; N, 5.32. |
| —CH(—C$_6$H$_5$)$_2$ | 3, 5 | 830 | 145 | $C_{38}H_{38}O_{10}N_2$: Calcd.: C, 66.85; H, 5.63; N, 4.11. Found: C, 66.54; H, 5.92; N, 4.12. |
| —CH$_2$CH(CH$_3$)—C$_6$H$_5$ | 3, 5 | 2,000 | 222 | $C_{34}H_{38}O_{10}N_2$: Calcd.: C, 64.34; H, 6.04; N, 4.43. Found: C, 64.18; H, 6.18; N, 4.44. |
| —CH$_2$CH(CH$_3$)$_2$ | 4 | — | 225 | |
| —CH(C$_2$H$_5$)—C$_6$H$_5$ | 3, 5 | 1,400 | 145 | $C_{34}H_{38}O_{10}N_2$: Calcd.: C, 64.34; H, 6.04; N, 4.43. Found: C, 63.89; H, 6.27; N, 4.23. |
| —CH=CHCH$_3$ | 3, 5 | 720 | 260 | $C_{28}H_{32}O_{10}N_2$: Calcd.: C, 60.42; H, 5.80; N, 5.03. Found: C, 60.64; H, 5.92; N, 4.80. |
| —CH=C(CH$_3$)$_2$ | 4 | 1,200 | 270 | $C_{29}H_{34}O_{10}N_2$: Calcd.: C, 61.04; H, 6.01; N, 4.91. Found: C, 61.27; H, 6.36; N, 4.5. |
| —C(CH$_3$)$_3$ | 1 | 730 | 165 | $C_{29}H_{36}O_{10}N_2$: Calcd.: C, 60.83; H, 6.33; N, 4.89. Found: C, 61.47; H, 6.59; N, 4.42. |
| —CH$_2$C(CH$_3$)$_3$ | 3, 5 | 1,025 | 170 | $C_{30}H_{38}O_{10}N_2$: Calcd.: C, 61.42; H, 6.53; N, 4.77. Found: C, 61.50; H, 6.62; N, 4.83. |
| —(CH$_2$)$_6$CH$_3$ | 4 | 340 | 130 | $C_{32}H_{42}O_{10}N_2$: Calcd.: C, 62.53; H, 6.99; N, 4.56. Found: C, 60.24; H, 6.97; N, 3.94. |
| —(CH$_2$)$_7$CH$_3$ | 4 | 700 | 156 | $C_{33}H_{44}O_{10}N_2$: Calcd.: C, 63.04; H, 7.05; N, 4.45. Found: C, 62.83; H, 7.03; N, 4.27. |
| —(CH$_2$)$_8$CH$_3$ | 4 | 500 | 195 | $C_{34}H_{46}O_{10}N_2$: Calcd.: C, 63.53; H, 7.21; N, 4.36. Found: C, 63.35; H, 7.07; N, 4.29. |

| X | Example | BL-C3 Assay | M.P., Degrees | Analysis for— |
|---|---|---|---|---|
| —CH=CH—⟨C₆H₄⟩—CH(CH₃)₂ | 4 | 490 | 163 | $C_{36}H_{40}O_{10}N_2$: Calcd.: C, 65.44; H, 6.10; N, 4.24. Found: C, 65.47; H, 6.49; N, 4.05. |
| —(CH₂)₁₂CH₃ | 4 | ≦5 | 172 | $C_{38}H_{54}O_{10}N_2$: Calcd.: C, 65.31; H, 7.79; N, 4.01. Found: C, 66.45; H, 8.43; N, 3.72. |
| —(CH₂)₁₇CH₃ | 4 | ≦5 | 200 | $C_{43}H_{64}O_{10}N_2$: Calcd.: C, 67.16; H, 8.39; N, 3.64. Found: C, 67.19; H, 8.45; N, 3.80. |
| —(CH₂)₂₀CH₃ | 4 | 30 | 175 | $C_{46}H_{70}O_{10}N_2$: Calcd.: C, 67.98; H, 8.70; N, 3.45. Found: C, 65.34; H, 8.55; N, 3.56. |
| —(CH₂)₉CH₃ | 6 | 120 | 209 | $C_{35}H_{48}O_{10}N_2$: Calcd.: C, 64.01; H, 7.37; N, 4.26. Found: C, 63.62; H, 6.99; N, 4.63. |
| —(CH₂)₁₀CH₃ | 6 | 40 | 207 | $C_{36}H_{50}O_{10}N_2$: Calcd.: C, 64.46; H, 7.51; N, 4.17. Found: C, 62.75; H, 7.28; N, 4.44. |
| —C(C₂H₅)=H—⟨C₆H₄⟩—NO₂ | 4 | 510 | 150 | $C_{35}H_{37}O_{12}N_3$: Calcd.: C, 60.77; H, 5.39; N, 6.07. Found: C, 61.06; H, 5.55; N, 6.09. |
| —CH(—CH₂—⟨C₆H₅⟩)₂ | 4 | 260 | 125 | $C_{40}H_{42}O_{10}N_2$: Calcd.: C, 67.59; H, 5.96; N, 3.94. Found: C, 69.50; H, 6.06; N, 3.55. |
| —CH(CH₂CH₂CH₃)₂ | 4 | 940 | 138 | $C_{32}H_{42}O_{10}N_2$: Calcd.: C, 62.53; H, 6.89; N, 4.56. Found: C, 62.50; H, 7.24; N, 4.59. |
| —CH(CH₂CH₃)CH₂—⟨C₆H₄⟩—NH₂ | 7 | 720 | 165 | $C_{35}H_{41}O_{10}N_3 \cdot H_2O$: Calcd.: C, 61.66; H, 6.36; N, 6.16. Found: C, 61.75; H, 6.41; N, 5.93. |
| —(CH₂)₅CH₃ | 4 | 640 | 140 | $C_{31}H_{40}O_{10}N_2$: Calcd.: C, 61.99; H, 6.71; N, 4.66. Found: C, 60.52; H, 7.20; N, 4.36. |
| —(CH₂)₂CH(CH₃)₂ | 3, 5 | 720 | 150 | $C_{30}H_{38}O_{10}N_2$: Calcd.: C, 61.42; H, 6.53; N, 4.77. Found: C, 61.81; H, 6.99; N, 4.34. |
| —(CH₂)₂—⟨S⟩ | 4 | -------------- | 164 | |
| —(CH₂)₃—⟨S⟩ | 4 | -------------- | 120 | |
| —C(CH₃)=CH—CH₃ | 4 | 1,850 | 150 | $C_{29}H_{34}O_{10}N_2$: Calcd.: C, 61.04; H, 6.01; N, 4.91. Found: C, 60.74; H, 6.53; N, 4.79. |
| —CH(CH₂CH₃)CH₂CH₃ | 4 | 1,100 | 222 | $C_{30}H_{38}O_{10}N_2$: Calcd.: C, 61.42; H, 6.53; N, 4.77. Found: C, 60.85; H, 6.53; N, 4.34. |
| —(CH₂)₁₁CH₃ | 6 | 30 | 193 | $C_{37}H_{52}O_{10}N_2$: Calcd.: C, 64.89; H, 7.65; N, 4.09. Found: C, 62.70; H, 7.20; N, 4.21. |
| —(CH₂)₂—⟨C₆H₃⟩(OH)(CH(CH₃)CH=CH₂) | 2 | 1,300 | 122 | $C_{37}H_{42}O_{11}N_2$: Calcd.: C, 64.34; H, 6.13; N, 4.05. Found: C, 63.26; H, 6.52; N, 4.17. |
| —(CH₂)₂—⟨C₆H₃⟩(OH)(CH₂CH=CH₂) | 6 | 560 | 130 | $C_{37}H_{42}O_{11}N_2$: Calcd.: C, 64.34; H, 6.13; N, 4.05. Found: C, 62.44; H, 6.22; N, 4.00. |
| —(CH₂)₂—⟨C₆H₃⟩(OH)(CH(CH₃)CH₂CH₃) | 7 | 840 | 100 | $C_{37}H_{44}O_{11}N_2$: Calcd.: C, 64.15; H, 6.40; N, 4.04. Found: C, 63.09; H, 4.93; N, 3.28. |

| X | Example | BL-C3 Assay | M.P., Degrees | Analysis for— |
|---|---|---|---|---|
| —CH$_2$—〈benzene〉—OH, $\overset{\|}{C}$O(CH$_2$)$_3$CH$_3$ | 2 | 70 | 145 | C$_{39}$H$_{46}$O$_{12}$N$_2$: Calcd.: C, 63.75; H, 6.31; N, 3.81. Found: C, 62.89; H, 5.97; N, 5.92. |
| —(CH$_2$)$_2$—〈benzene〉—OH, (CH$_2$)$_3$ $\overset{\|}{C}$H$_3$ | 7 | 800 | 130 | C$_{37}$H$_{44}$O$_{11}$N$_2$: Calcd.: C, 64.15; H, 40; N, 4.04. Found: C, 64.13; H, 6.62; N, 4.37. |

EXAMPLE 9

(A) Bis-carbobenzoximide of coumermycin A$_1$

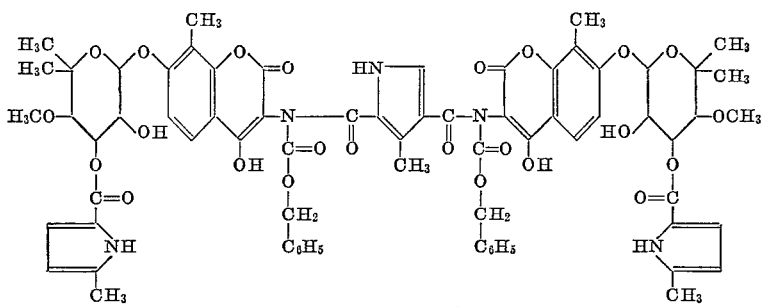

Monosodium coumermycin A$_1$ (60 g., 0.053 mole) was dissolved in 1250 ml. of tetrahydrofuran (THF) with slight warming on a steam bath. After allowing the deep yellow-gold solution to cool to 25° C., 44.6 ml. of triethylamine (6 equivalents) was carefully added with vigorous stirring. The mixture immediately started to gel, although rapid stirring kept the gel mobile.

Five equivalents (36 ml.) of benzylchloroformate, diluted to 250 ml. volume with THF, was added dropwise to the vigorously stirred gel-solution at 25° C. over a 30 minute period.

After one hour, the gel disappeared and the presence of triethylamine hydrochloride precipitate was noted. The stirring of the yellow solution was continued at 25° C. for an additional 24 hours.

The solution was filtered to remove the triethylamine hydrochloride, and concentrated in vacuo to approximately one-tenth its original volume. The light yellow-orange solution was poured into 3000 ml. of Skellysolve-B with vigorous stirring. An immediate precipitate of a light cream-colored solid appeared. After stirring for one hour at 25° C. it was filtered, washed with four 100 ml. portions of n-hexane, and dried to yield 77.4 g. of semi-pure bis-carbobenzoximido-coumermycin A$_1$ (as illustrated above). M.P.: softens at 145–150° C., decomposes with effervescence at 190–200° C. It is probable that this solid consisting mainly of the desired product, was contaminated by small quantities of tri- and tetra-substituted carbobenzoxy side products, since one or both of the 4-hydroxyl functions of the coumarin moieties of coumermycin A$_1$ is capable of being carbobenzoxylated as well. It is noted however, that these small quantities of side products do not interfere with the subsequent steps of the process and are either eliminated or converted back to desired product as a matter of course as the process is practiced. The infrared spectrum (IR) of the solid product showed a very weak amide II band near 1530 cm.$^{-1}$ indicating the presence of little, if any, starting material. Staph. aureus plate assay 2.5 to 5.0 mcg./mg.

(B) 3-carbobenzoxamido-4-hydroxy-8-methyl-7-[3-O-(5-methyl-2-pyrrolylcarbonyl)noviosyloxy/coumarin

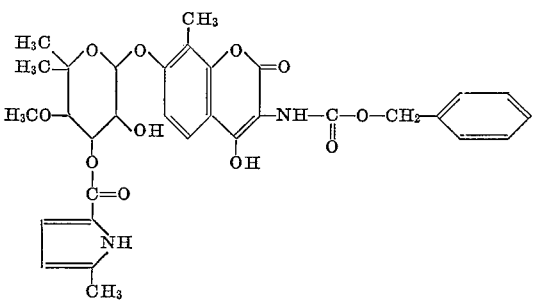

Seventy-five grams of the bis-carbobenzoximide of coumermycin A$_1$ obtained in Example I was dissolved in 1200 ml. of pyridine at 25° C. to make a light orange-colored solution. It was warmed to 50–55° C. for at least 24 hours during which time it was stirred.

The resultant orange-brown solution was concentrated in vacuo to about one-fifth its original volume and was poured into 3000 ml. of ice water with vigorous stirring. The pH was adjusted to pH 1–2 with 6 N hydrochloric acid, then stirred for an additional hour.

The suspension was filtered to yield 57.9 g. of light cream-tan colored solids which were dried in vacuo to constant weight.

The carbobenzoxamido derivative is quite chloroform-soluble while the undesired side products are not. The whole solids (50.0 g.) were placed in a Soxhlet extraction apparatus and continuously extracted until the materials extracted from the whole became negligible. Evaporation of the chloroform extracts produced approximately 15 g. of chloroform soluble materials. This residue was redissolved in a small portion of chloroform and extracted with 5% aqueous sodium bicarbonate to remove any acidic impurities. The chloroform solution was dried over anhydrous sodium sulfate and fractionally precipitated from solution by the addition of increasing amounts of Skellysolve-B (petroleum solvent, B.P. 60–68° C., essentially n-hexane) to yield a pure fraction 4.5 g., of material identified as 3-carbobenzoximido-4-hydroxy-8-methyl-7-[3 - O - (5 - methyl - 2 - pyrrolylcarbonyl)noviosyloxy] coumarin as a white, crystalline solid, M.P.: softens at 110° C., gelling at 125° C., melts with effervescence at 155–160° C.

The infrared (IR) and nuclear magnetic resonance (NMR) spectra were consistent with the structure of the title compound.

*Analysis.*—Calcd. for $C_{32}H_{34}O_{11}N_2$: C, 61.73; H, 5.51; N, 4.50. Found: C, 61.14; H, 5.65; N, 4.83.

(C) 3 - amino-4-hydroxy-8-methyl-7-[3-O-(5-methyl-2-pyrrolyl - carbonyl)noviosyloxy/coumarin (platinum oxide catalyst)

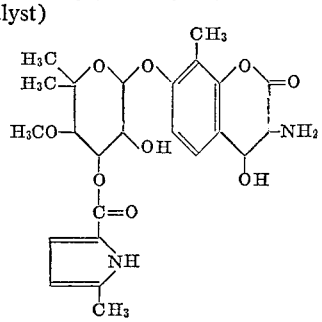

3 - carbobenzoxamido - 4 - hydroxy - 8 - methyl - 7 - [3 - O - (5 - methyl - 2 - pyrrolylcarbonyl)noviosyloxy] coumarin (1.8 g., 2.90 mmoles), obtained from Example 4, was dissolved in 150 ml. of glacial acetic acid to produce a pale yellow solution. To this solution was added 500 mg. of platinum oxide catalyst and the resultant solution-suspension treated with hydrogen in a Parr hydrogenation apparatus at an initial pressure of 52.5 lb./in.² The reduction was run for 24 hours at room temperature with agitation. The total uptake of hydrogen was 15.7 lb./in.²

The catalyst was removed by filtration over a filter-aid pad under a nitrogen atmosphere, and the solution was immediately evaporated in vacuo. Twenty ml. of acetone was added to the residue and it was again evaporated to dryness in vacuo. The procedure was repeated 4 more times. The resultant residue was dried in vacuo over sodium hydroxide to yield 1.0 g. of a light yellow-gold solid, M.P. 196–200° C. IR and NMR analysis of this solid was consistent with the structure of the title compound, 3-amino-4-hydroxy-8-methyl-7-[3-O-(5-methyl-2-pyrrolylcarbonyl)noviosyloxy]coumarin. It is sensitive to oxidation, particularly when in solution.

*Analysis.*—Calcd. for $C_{24}H_{28}O_9N_2$: C, 59.01; H, 5.79; N, 5.74. Found: C, 58.39; H, 6.02; N, 5.70.

*Analysis.*—Calcd. for $C_{24}H_{28}O_9N_2 \cdot 1/2H_2O$: C, 57.94; H, 5.88; N, 5.63.

EXAMPLE 10

3-benzamido-4-hydroxy-8-methyl-7-[3-O-(5-methyl-2-pyrrolylcarbonyl)noviosyloxy]coumarin

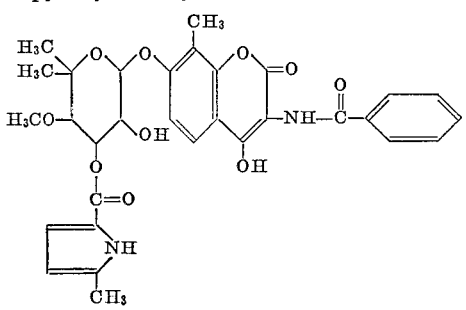

3-amino-4-hydroxy - 8 - methyl - 7 - [3-O-(5-methyl-2-pyrrolylcarbonyl)noviosyloxy]coumarin (250 mg., 0.51 mmole), obtained from Example 5, was dissolved in 10 ml. of pyridine.

To this solution was added benzoic anhydride (139 mg., 0.613 mmole) with vigorous stirring at 25° C. The reaction was stirred at room temperature for a total of 70 hours under an $N_2$ atmosphere and then poured into 150 mg. of ice water containing 20 ml. of 6 N hydrochloric acid. The mixture was stirred for one hour and the precipitate collected by vacuum filtration to yield 253 mg. of a light peach-colored solid that was identified as 3-benzamido - 4 - hydroxy - 8 - methyl-7-[3-O-(5-methyl-2 - pyrrolylcarbonyl)noviosyloxy]coumarin, M.P.: tans and softens 190° C., browns beginning at 210° C., finally decomposes vigorously at 230–235° C. (turns black). *Staph. aureus* assay 44 μg./mg. (coumermycin $A_1$ standard). This compound was arbitrarily established as the reference standard for the semi-synthetic coumermycin derivatives of the present invention.

*Analysis.*—Calcd. for $C_{31}H_{32}O_{10}N_2$: C, 62.83; H, 5.45; N, 4.73. Found: C, 63.49; H, 5.78; N, 4.43.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. The compound having the formula

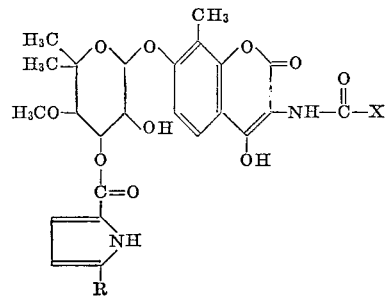

wherein R is either hydrogen or methyl, and X is a group having the formula

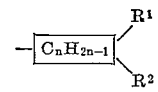

or

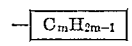

in which $n$ is an integer of 1 to 21, $m$ is an integer of 2 to 21, $R^1$ and $R^2$ are alike or different and are —H, cyclohexyl or

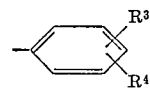

wherein $R^3$ and $R^4$ are alike or different and each represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower) alkoxy, hydroxy, carboxy, carb(lower)alkoxy, acetoxy, mercapto, thioacetoxy or (lower)alkylthio; and a non-toxic pharmaceutically acceptable cationic salt thereof.

2. The compound of claim 1 wherein R is hydrogen or methyl; X is a group having the formula

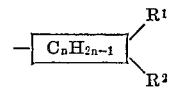

or

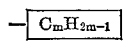

in which $n$ is an integer of 1 to 13, $m$ is an integer of 2 to 13, $R^1$ and $R^2$ are alike or different and are —H, cyclohexyl or

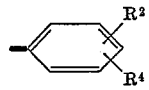

wherein $R^3$ and $R^4$ are alike or different and each represents hydrogen, fluoro, chloro, bromo, iodo, trifluoromethyl, N,N-di(lower)alkylamino, nitro, cyano, (lower)alkyl, (lower)alkenyl, (lower)alkynyl, (lower)alkoxy, N,N-di(loweralkylcarboxamido, carb(lower)alkoxy, acetoxy, thioacetoxy or (lower)alkylthio; and a nontoxic pharmaceutically acceptable cationic salts thereof.

3. The compound of claim 1 wherein R is methyl, X is a group having the formula

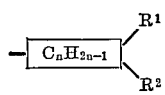

or

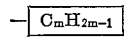

in which $n$ is an integer of 1 to 13, $m$ is an integer of 2 to 13, $R^1$ and $R^2$ are alike or different and are —H or

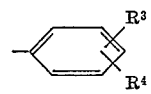

wherein $R^3$ and $R^4$ are alike or different and each represent hydrogen, fluoro, chloro, bromo, iodo, trifluoromethyl, amino, nitro, cyano, (lower)alkyl, (lower)alkenyl, (lower)alkynyl, (lower)alkoxy, hydroxy, carboxy, carb(lower)alkoxy and acetoxy; and a nontoxic, pharmaceutically acceptable cationic salt thereof.

4. The compound of claim 1 wherein R is methyl, X is a group having the formula

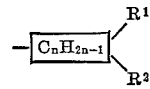

or

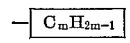

in which $n$ is an integer of 1 to 8, $m$ is an integer of 2 to 8, and $R^1$ and $R^2$ are alike or different and are —H or

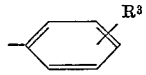

in which $R^3$ represents hydrogen, fluoro, chloro, bromo, iodo, trifluoromethyl, amino, N,N-di(lower)alkylamino, nitro, cyano, (lower)alkyl, (lower)alkenyl, (lower)alkynyl, (lower)alkoxy, hydroxy, mercapto, carboxy, carb(lower)alkoxy, acetoxy, thioacetoxy, or (lower)alkylthio and the nontoxic, pharmaceutically acceptable cationic salts thereof.

5. The compound of claim 1 wherein R is methyl, X is a group having the formula

in which $n$ is an integer of 1 to 8, $R^1$ and $R^2$ are both hydrogen; and a nontoxic pharmaceutically acceptable salt thereof.

6. The compound of claim 1 wherein R is methyl and X is

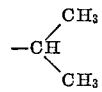

and a nontoxic, pharmaceutically acceptable salt thereof.

7. The sodium salt of the compound of claim 6.
8. The potassium salt of the compound of claim 6.

References Cited

UNITED STATES PATENTS

| | | | |
|---|---|---|---|
| 3,380,994 | 4/1968 | Nettleton | 260—210 |
| 3,428,623 | 2/1969 | Keil et al. | 260—210 |

LEWIS GOTTS, Primary Examiner

JOHNNIE R. BROWN, Assistant Examiner

U.S. Cl. X.R.

99—2; 424—180

UNITED STATES PATENT OFFICE
CERTIFICATE OF CORRECTION

Patent No. 3,494,914　　　　　　　Dated February 10, 1970

Inventor(s) John Gerard Keil and Irving R. Hooper

It is certified that error appears in the above-identified patent and that said Letters Patent are hereby corrected as shown below:

In Claim 2 the formula should read:

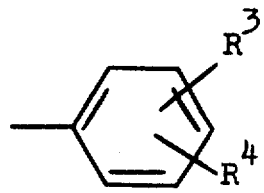

(column 29, lines 8-10)

Claim 2, column 29, line 16, should read "N,N-di(lower)-alkylcarboxamido,".

SIGNED AND
SEALED
JUL 7 1970

(SEAL)
Attest:

Edward M. Fletcher, Jr.
Attesting Officer

WILLIAM E. SCHUYLER, JR.
Commissioner of Patents